(No Model.)

R. C. FAY
PLOW.

No. 535,689. Patented Mar. 12, 1895.

Witnesses.
Ann Long
D. W. Eckelin

Inventor.
Richard C. Fay

UNITED STATES PATENT OFFICE.

RICHARD C. FAY, OF STELTON, NEW JERSEY.

PLOW.

SPECIFICATION forming part of Letters Patent No. 535,689, dated March 12, 1895.

Application filed September 24, 1894. Serial No. 523,974. (No model.)

*To all whom it may concern:*

Be it known that I, RICHARD CARTER FAY, a citizen of the United States, residing at Stelton, in the county of Middlesex and State of New Jersey, have invented an Improvement in Plows, which is fully set forth in the following specification and accompanying drawings, which illustrate a plow with the improvement, in which—

Figure 1:
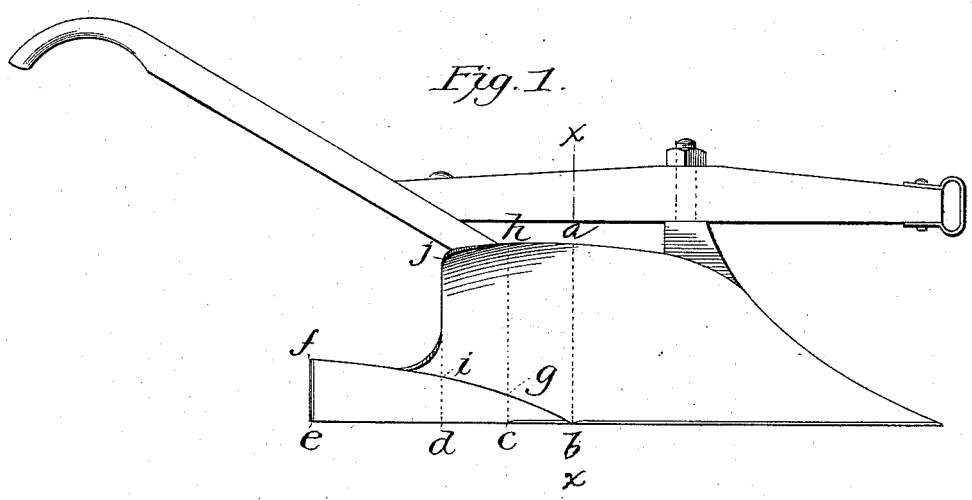
Figure 2:
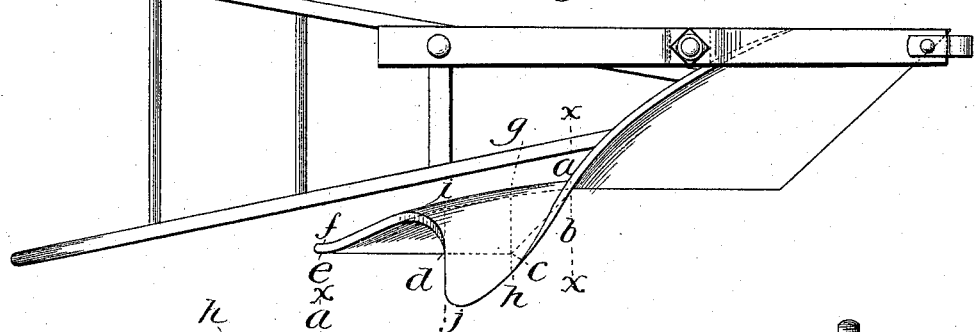
Figure 4:
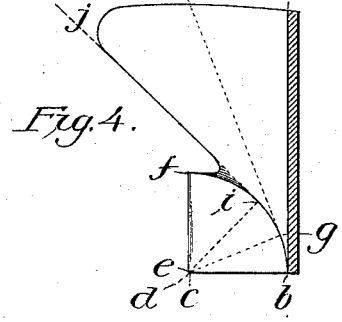
Figure 3:
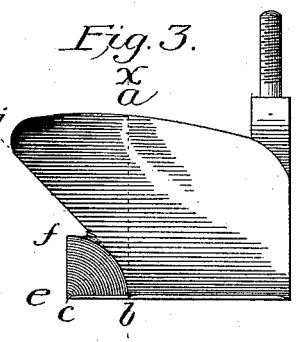

Figure 1 is a side view. Fig. 2 is a plan. Fig. 3 is a front view. Fig. 4 is a front view in detail of the improvement, from the line $a$. $b$. where the mold-board of a plow stands vertically, which is in section.

Similar letters refer to similar parts throughout the several views.

The object of my invention is to obtain neat flat plowing, which I attain by placing at the side of a plow, (and in the rear of the line $x$—$x$ where the mold-board of a plow stands vertical) an auxiliary mold-board which projects from the side of the plow the depth of the plowing, for the purpose of keeping the side of the furrow slice in shape, and pressing it into position in the furrow, as the mold-board lays it over.

For its construction, from the line $x$—$x$ where the mold-board of a plow stands vertical, an auxiliary mold-board $b. c. e. f.$ is placed, which projects from the plow the depth of plowing, having a spiral surface, which turns from the horizontal share $b. c.$ to its vertical end $f. e.$ and a mold-board $a. b. i. j.$ which is fitted, or is made a continuation of the mold-board of a plow, from the line $x$—$x$ where the mold-board stands vertical, and from that vertical line it turns spirally outward to its end $j. i.$ about forty degrees, and terminates at or near the center of the auxiliary mold-board. The auxiliary mold-board $b. c. e. f.$ and mold-board $a. b. i. j.$ (from the line $x$—$x$ where the mold-board of a plow stands vertical), when combined the surfaces are at right angles to each other, forming right angles as $c. g. h.$ and $d. i. j.$ making a spiral curve $b. g. i. f.$ between them. The width of the surface of the auxiliary mold-board is equal to the depth of the plowing, from the rear corner of the share $c.$ to $g.$ to its vertical end $e. f.$, and the surface of the mold-board, is equal to the width of the furrow slice, from its vertical position $a. b.$ to its end $i. j.$ The two mold-boards combined make right angles, which fit two sides of the furrow slice, as it is laid over and pressed into position.

If the width of the furrow slice is eight inches and the depth is four inches, it is therefore necessary to have twelve inches of furrow space to turn over and lay flat an eight inch furrow slice, and in this case the auxiliary mold-board would project four inches and be four inches high.

Having described my invention, what I claim, and desire to secure by Letters Patent, is—

1. An auxiliary mold-board placed at the side of a plow, and extending rearwardly from the line where the mold-board of the plow stands vertical and having a spiral surface turned from the horizontal share in front to its vertical rear end and which projects from the plow the depth of the plowing, substantially as described, and shown and for the purpose specified.

2. In combination with the rear part of the mold-board of a plow, an auxiliary mold-board arranged at the side thereof and extending rearwardly from the line where the main mold-board stands vertical, substantially as described and shown and for the purpose specified.

RICHARD C. FAY.

Witnesses:
M. A. HARKINE,
ROBT. G. MILLER.